US009356598B2

(12) United States Patent
Vrudhula et al.

(10) Patent No.: US 9,356,598 B2
(45) Date of Patent: May 31, 2016

(54) THRESHOLD LOGIC GATES WITH RESISTIVE NETWORKS (71) Applicants: Sarma Vrudhula, Chandler, AZ (US); Jinghua Yang, Tempe, AZ (US); Niranjan Kulkarni, Phoenix, AZ (US); Shimeng Yu, Tempe, AZ (US)

(72) Inventors: Sarma Vrudhula, Chandler, AZ (US); Jinghua Yang, Tempe, AZ (US); Niranjan Kulkarni, Phoenix, AZ (US); Shimeng Yu, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 14/792,163

(22) Filed: Jul. 6, 2015

(65) Prior Publication Data
US 2016/0006437 A1    Jan. 7, 2016

Related U.S. Application Data (60) Provisional application No. 62/020,509, filed on Jul. 3, 2014.

(51) Int. Cl.
*G11C 7/06* (2006.01)
*H03K 19/23* (2006.01)
(Continued)

(52) U.S. Cl.
CPC .......... *H03K 19/0013* (2013.01); *G06F 17/505* (2013.01); *G06F 17/5068* (2013.01); *G11C 7/065* (2013.01); *G11C 13/0002* (2013.01); *G11C 13/003* (2013.01); *G11C 13/004* (2013.01); *G11C 17/165* (2013.01); *G11C 17/18* (2013.01); *H03K 19/0027* (2013.01);
(Continued)

(58) Field of Classification Search
CPC .................... G11C 11/1673; G11C 2013/0042; G11C 2207/063; G11C 7/06; G06F 2207/4818; H03K 19/0813; H03K 19/23; H03K 2217/94026
See application file for complete search history.

(56) References Cited

U.S. PATENT DOCUMENTS 4,027,175 A    5/1977 Hurst
4,874,963 A    10/1989 Alspector
(Continued)

FOREIGN PATENT DOCUMENTS

WO    2015006342 A1    1/2015

OTHER PUBLICATIONS

Avedillo, M.J., et al., "Low-power CMOS threshold-logic gate," Electronics Letters, vol. 31, No. 25, Dec. 7, 1995, pp. 2157-2159.
(Continued)

*Primary Examiner* — Vibol Tan
(74) *Attorney, Agent, or Firm* — Withrow & Terranova, P.L.L.C.

(57) ABSTRACT

This disclosure relates generally to threshold logic elements for integrated circuits (ICs). In one embodiment, a threshold logic element has a first input gate network, a second input gate network, a differential sense amplifier, and a resistive network. The first input gate network is configured to receive a first set of logical signals, while the second input gate network configured to receive a second set of logical signals. The differential sense amplifier is operably associated with the first input gate network and the second input gate network such that the differential sense amplifier is configured to generate a differential output in accordance with a threshold logic function. The resistive network is coupled between the differential sense amplifier and the first input gate network and between the differential sense amplifier and the second input gate network. The resistive network makes the threshold logic element less susceptible to process variations.

20 Claims, 6 Drawing Sheets

(51) Int. Cl.

| | |
|---|---|
| H03K 19/00 | (2006.01) |
| G11C 13/00 | (2006.01) |
| G06F 17/50 | (2006.01) |
| H03K 19/08 | (2006.01) |
| H03K 19/017 | (2006.01) |
| H03K 19/21 | (2006.01) |
| G11C 17/16 | (2006.01) |
| G11C 17/18 | (2006.01) |

(52) U.S. Cl.
CPC ...... *H03K19/01707* (2013.01); *H03K 19/0813* (2013.01); *H03K 19/215* (2013.01); *G06F 2217/12* (2013.01); *G11C 2013/0042* (2013.01); *G11C 2213/71* (2013.01); *G11C 2213/79* (2013.01)

(56) References Cited

U.S. PATENT DOCUMENTS

| | | | |
|---|---|---|---|
| 5,053,645 A | 10/1991 | Harada | |
| 5,058,034 A | 10/1991 | Murphy et al. | |
| 5,153,853 A * | 10/1992 | Eby | G11C 14/00 365/185.08 |
| 5,479,572 A | 12/1995 | Marcantonio | |
| 5,479,579 A | 12/1995 | Duong et al. | |
| 6,838,909 B2 * | 1/2005 | Huang | H03K 19/01707 326/121 |
| 8,164,359 B2 * | 4/2012 | Leshner | H03K 19/0813 326/113 |
| 8,181,133 B2 | 5/2012 | Gowda et al. | |
| 8,601,417 B2 | 12/2013 | Gowda et al. | |
| 8,832,614 B2 * | 9/2014 | Vrudhula | G06F 17/505 703/16 |
| 8,994,406 B2 * | 3/2015 | Chang | H03K 17/165 326/112 |
| 2011/0267914 A1 * | 11/2011 | Ishikura | G11C 7/06 365/208 |
| 2013/0313623 A1 * | 11/2013 | Vrudhula | H01L 43/02 257/295 |
| 2016/0006437 A1 * | 1/2016 | Vrudhula | H03K 19/215 326/36 |

OTHER PUBLICATIONS

Beiu, V., et al., "VLSI Implementations of Threshold Logic—A Comprehensive Survey," IEEE Transactions on Neural Networks, vol. 14, No. 5, Sep. 2003, pp. 1217-1243.

Bruck, J., et al., "On the Power of Neural Networks for Solving Hard Problems," Presented at the IEEE Neural Information Processing Systems Conference, Nov. 1987, Denver, Colorado, pp. 129-135.

Deng, Y., et al., "RRAM Crossbar Array With Cell Selection Device: A Device and Circuit Interaction Study," IEEE Transactions on Electron Devices, vol. 60, No. 2, Feb. 2013, pp. 719-726.

Fang, Z., et al., "HfOx/TiOx/HfOx/TiOx Multilayer-Based Forming-Free RRAM Devices With Excellent Uniformity," IEEE Electron Device Letters, vol. 32, No. 4, Apr. 2011, pp. 566-568.

Gowda, T., et al., "Identification of Threshold Functions and Synthesis of Threshold Networks," IEEE Transactions on Computer-Aided Design of Integrated Circuits and Systems, vol. 30, No. 5, May 2011, pp. 665-677.

Guan, X, et al., "A SPICE Compact Model of Metal Oxide Resistive Switching Memory With Variations," IEEE Electron Device Letters, vol. 33, No. 10, Oct. 2012, pp. 1405-1407.

Hidalgo-Lopez, J.A., et al., "New Types of Digital Comparators," International Symposium on Circuits and Systems, vol. 1, 1995, pp. 29-32.

Leshner, S., et al., "Design of a robust, high performance standard cell threshold logic family for DSM technology," 22nd International Conference on Microelectronics (ICM 2010), Dec. 2010, Cairo, Egypt, pp. 52-55.

Mazumder, P., et al., "Memristors: Devices, Models, and Applications," in Proceedings of IEEE, vol. 100, No. 6, Jun. 2012, pp. 1911-1919.

Miller, W.T., et al., "Design and Implementation of a High Speed CMAC Neural Network Using Programmable CMOS Logic Cell Arrays," Advances in Neural Information Processing Systems 3 (NIPS 1990), 1990, 6 pages.

Nukala, N. S., et al., "Spintronic Threshold Logic Array (STLA)—A compact, low leakage, non-volatile gate array architecture," J. Parallel Distrib. Comput., vol. 74, 2014, available online Oct. 2013, pp. 2452-2460.

Padure, M., et al., "A New Latch-Based Threshold Logic Family," in International Semiconductor Conference, vol. 2, 2001, pp. 531-534.

Parekh, R., et al., "Constructive Neural-Network Learning Algorithms for Pattern Classification," IEEE Transactions On Neural Networks, vol. 11, No. 2, Mar. 2000, pp. 436-451.

Rothenbuhler, A. et al., "Reconfigurable Threshold Logic Gates using Memristive Devices," J. Low Power Electron. Appl., vol. 3, 2014, pp. 174-193.

Soltiz, M., et al., "Memristor-Based Neural Logic Blocks for Nonlinearly Separable Functions," IEEE Transactions On Computers, vol. 62, No. 8, Aug. 2013, pp. 1597-1606.

Soltiz, M., et al., "RRAM-based Adaptive Neural Logic Block for Implementing Non-Linearly Separable Functions in a Single Layer," Proceedings of the IEEE/ACM International Symposium on Nanoscale Architectures (NANOARCH), Jul. 2012, pp. 218-225.

Strandberg, R., et al., "Single Input Current-Sensing Differential Logic (SCSDL)," IEEE International Symposium on Circuits and Systems, vol. 1, 2000, pp. 764-767.

Wong, H.S.P., et al., "Metal-Oxide RRAM," Proceedings of the IEEE, vol. 100, No. 6, May 2012, pp. 1951-1970.

Wong, H.S.P., et al., "Phase Change Memory," Proceedings of the IEEE, vol. 98, No. 12, Dec. 2010, pp. 2201-2227.

Yang, J., et al., "Integration of Threshold Logic Gates with RRAM devices for Energy Efficient and Robust Operation," Proceedings of the IEEE/ACM International Symposium on Nanoscale Architectures (NANOARCH), Jul. 8-10, 2014, pp. 39-44.

Yu, S., et al., "Investigating the switching dynamics and multilevel capability of bipolar metal oxide resistive switching memory," Applied Physics Letters, vol. 98, 103514, Mar. 2011, 4 pages.

Zhu, Jian-Gang, "Magnetoresistive Random Access Memory: The Path to Competitiveness and Scalability," Proceedings of the IEEE, vol. 96, No. 11, Nov. 2008, pp. 1786-1798.

\* cited by examiner

THRESHOLD LOGIC GATES WITH RESISTIVE NETWORKS

RELATED APPLICATIONS

This application claims the benefit of provisional patent application Ser. No. 62/020,509, filed Jul. 3, 2014, the disclosure of which is hereby incorporated herein by reference in its entirety.

This invention was made with government funds under 1237856 and 0856090 awarded by the National Science Foundation. The U.S. Government has certain rights in this invention.

FIELD OF THE DISCLOSURE

This disclosure relates to threshold logic elements for integrated circuits (ICs).

BACKGROUND

A threshold logic element is defined as an n-input processing element having an output defined as:

$$f_T(X) = \begin{cases} 1, & \text{if } \sum_{i=1}^{n} w_i x_i \geq T \\ 0, & \text{Otherwise} \end{cases} \quad (1)$$

$$f_T(X) = \begin{cases} 1, & \text{if } \sum_{i=1}^{n} w_i x_i \leq T \\ 0, & \text{Otherwise} \end{cases} \quad (2)$$

$$f_T(X) = \begin{cases} 0, & \text{if } \sum_{i=1}^{n} w_i x_i \geq T \\ 1, & \text{Otherwise} \end{cases} \quad (3)$$

$$f_T(X) = \begin{cases} 0, & \text{if } \sum_{i=1}^{n} w_i x_i \leq T \\ 1, & \text{Otherwise} \end{cases} \quad (4)$$

where $X=[x_0, x_1, \ldots, x_{n-1}]$, $W=[w_0, w_1, \ldots, w_{n-1}]$, and $T$ are a set of data inputs that represent Boolean variables, a set of fixed signed integer weights associated with data inputs, and a threshold, respectively. A threshold logic element may be used to implement a threshold logic function as described by one of the equations above, which is equivalent to a complex Boolean function. Threshold logic elements may occupy less room than the Boolean network needed to implement the complex Boolean function. There is a need for a threshold logic gate, or element, that is robust and has low leakage power and high performance characteristics.

SUMMARY

This disclosure relates generally to threshold logic elements for integrated circuits (ICs). In one embodiment, a threshold logic element has a first input gate network, a second input gate network, a differential sense amplifier, and a resistive network. The first input gate network is configured to receive a first set of logical signals; while the second input gate network is configured to receive a second set of logical signals. The differential sense amplifier is operably associated with the first input gate network and the second input gate network such that the differential sense amplifier is configured to generate a differential output in accordance with a threshold logic function. The resistive network is coupled between the differential sense amplifier and the first input gate network and between the differential sense amplifier and the second input gate network. In this manner, the resistive network can be permitted to create a large enough voltage drop such that the first input gate network and the second input gate network operate linearly during an evaluation state. This increases the robustness of the threshold logic element by making the threshold logic element less susceptible to process variations.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
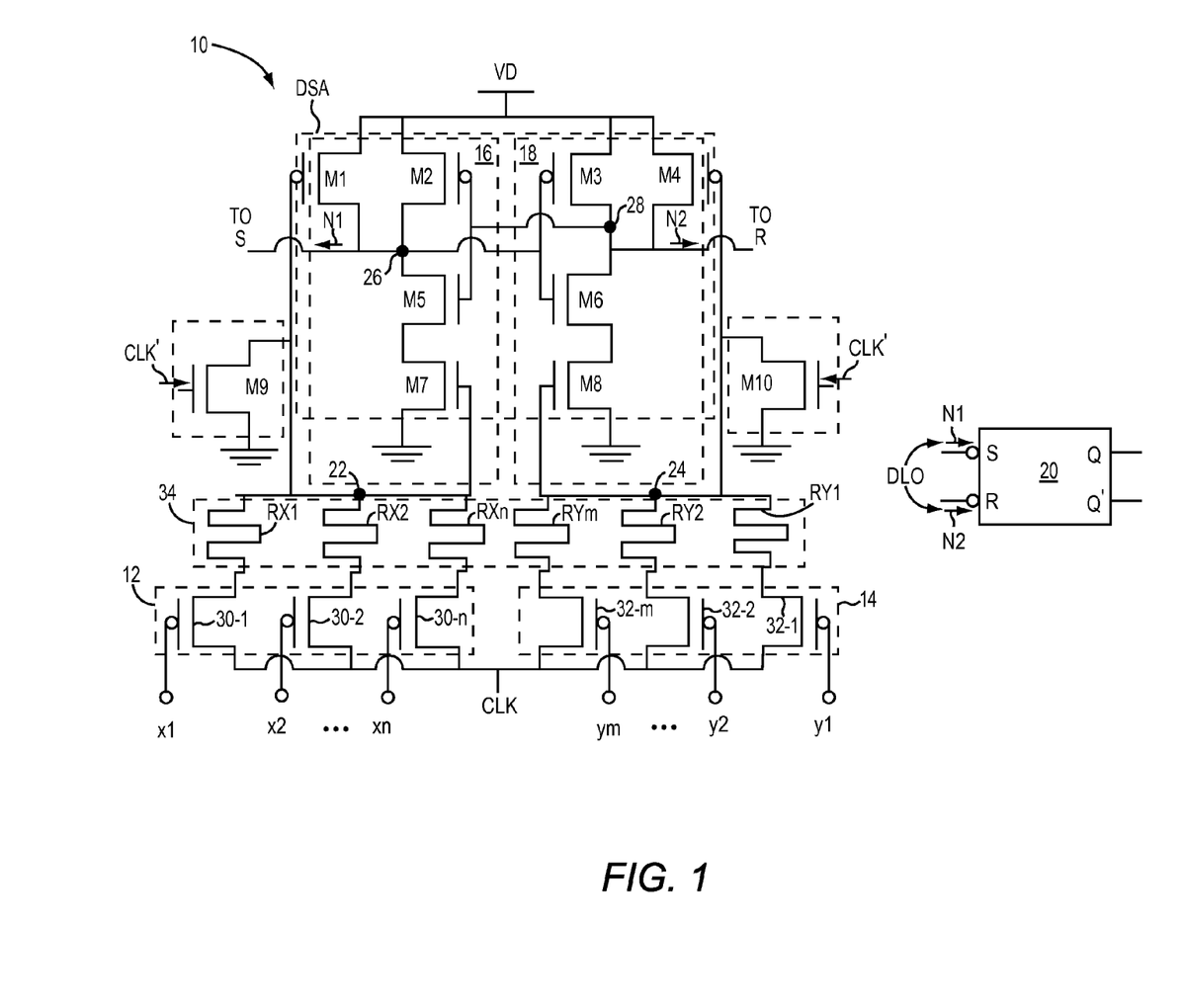
FIG. 1 illustrates an embodiment of a threshold logic element having a first input gate network, a second input gate network, a differential sense amplifier, and a resistive network configured to increase the robustness of the threshold logic element.

FIG. 1 illustrates an embodiment of a threshold logic element (TLE) 10. In general, the TLE 10 includes an first input gate network 12, a second input gate network 14, a resistive network 34, and a differential sense amplifier DSA formed by a first amplifier branch 16 and a second amplifier branch 18. The TLE 10 is configured to perform a threshold logic function. In this embodiment, the TLE 10 includes a sequential state element 20 in order to store a result of the threshold logic function performed by the TLE 10. As discussed below in detail, the first input gate network 12 is formed by a number of parallel transmission gates. The transmission gates in the first input gate network 12 are driven by a first set of logical signals, which in this case are logical inputs. Likewise, the second input gate network 14 is formed by a number of parallel transmission gates. The transmission gates in the second input gate network 14 are driven by a second set of logical signals, which in this example are logical inputs. As explained in further detail below, the first set of logical inputs may include data inputs and/or threshold inputs. Furthermore, the second set of logical inputs may include data inputs and/or threshold inputs. In this manner, the differential sense amplifier DSA is operably associated with the first input gate network 12 and the second input gate network 14 such that the differential sense amplifier DSA is operable to generate a differential logical output DLO in accordance with the threshold logic function of the TLE 10. The threshold logic function may be equivalent to a complex Boolean logic function. However, to perform the Boolean logic function a large network of Boolean logic gates may be needed. Thus, by performing the equivalent threshold logic function with the TLE 10 instead of with the large network of Boolean logic gates, the TLE 10 can provide increased spatial efficiency in an integrated circuit (IC).

The first input gate network 12 is driven by the first set of logical inputs and generates an output at an isolated control node 22 of the first amplifier branch 16 such that the first set of logical inputs operate to control the first amplifier branch 16 in the manner described below. The second input gate network 14 is connected to an isolated control node 24 of the second amplifier branch 18 such that the second set of logical inputs operate to control the second amplifier branch 18 in the manner described below. Because the first input gate network 12 and the second input gate network 14 are isolated from the first amplifier branch 16 and the second amplifier branch 18, respectively, the TLE 10 is robust to process variations.

In this embodiment, the differential sense amplifier DSA is formed by transistors M1-M8. More specifically, the first amplifier branch 16 is formed by transistors M1, M2, M5, and M7 connected as shown. Likewise, the second amplifier branch 18 is formed by transistors M3, M4, M6, and M8 connected as shown. The sequential state element 20 has a first input terminal S connected to an output node 26 of the first amplifier branch 16 and a second input terminal R connected to an output node 28 of the second amplifier branch 18. Based on the differential logical output DLO at the output nodes 26 and 28, the sequential state element 20 operates to provide a logical output Q and an inverted logical output Q', which is inverted with respect to the logical output Q. A transistor M9 is coupled to the first amplifier branch 16 between a gate of the transistor M1 and the isolated control node 22. The transistor M9 is configured so as to receive an inverted clock signal CLK', which is an inverse of a clock signal CLK. Furthermore, a transistor M10 is coupled to the second amplifier branch 18 between a gate of the transistor M4 and the isolated control node 24. The transistor M10 is also configured so as to receive the inverted clock signal CLK'. Each of the transistors M1 through M10 is a field effect transistor (FET), such as a Complementary Metal-Oxide-Semiconductor (CMOS) transistor. However, the present invention is not limited thereto, and other types of transistors, such as other types of FETs may be utilized. As explained in further detail below, the transistors M9, M10 are each discharge devices.

With respect to the first amplifier branch 16, each of the transistors M1, M2 is a P-channel field effect transistor (PFET). Each of the transistors M1, M2 also has a source coupled to receive a supply voltage VD and a drain coupled to the output node 26. Each of the transistors M5, M7 is an N-channel field effect transistor (NFET). A drain of the transistor M5 is coupled to the output node 26, and a source of the transistor M5 is coupled to a drain of the transistor M7. A source of the transistor M7 is coupled to ground. The gate of the transistor M1 is coupled to the isolated control node 22. Furthermore, a gate of the transistor M2 and a gate of the transistor M5 are each coupled to an output node 28 of the second amplifier branch 18. A gate of the transistor M7 is coupled to the isolated control node 22. With regard to the transistor M9, the transistor M9 is an NFET. A drain of the transistor M9 is coupled between the gate of the transistor M1 and the isolated control node 22. A source of the transistor M9 is coupled to ground. A gate of the transistor M9 is coupled to receive the inverted clock signal CLK'.

With respect to the second amplifier branch 18, each of the transistors M3, M4 is a PFET. Each of the transistors M3, M4 also has a source coupled to receive the supply voltage VD and a drain coupled to the output node 28. Each of the transistors M6, M8 is a NFET. A drain of the transistor M6 is coupled to the output node 28 and a source of the transistor M6 is coupled to a drain of the transistor M8. A source of the transistor M8 is coupled to ground. The gate of the transistor M4 is coupled to the isolated control node 24. Furthermore, a gate of the transistor M3 and a gate of the transistor M6 are coupled to an output node 26 of the first amplifier branch 16. A gate of the transistor M8 is coupled to the isolated control node 24. With regard to the transistor M10, the transistor M10 is an NFET. A drain of the transistor M10 is coupled between the gate of the transistor M4 and the isolated control node 24. A source of the transistor M10 is coupled to ground. A gate of the transistor M10 is coupled to receive the inverted clock signal CLK'.

As such, the first amplifier branch 16 and the second amplifier branch 18 are provided as cross-coupled NAND gates. More specifically, the first amplifier branch 16 forms a first NAND gate, where the isolated control node 22 can be considered an input node and the gate of the transistor M2 can be considered as another input node. The output node 26 provides the output node of the first NAND gate. The second amplifier branch 18 forms a second NAND gate, where the isolated control node 24 can be considered an input node and the gate of the transistor M3 can be considered as another input node. The output node 28 provides the output node of the second NAND gate.

The TLE 10 of FIG. 1 operates in two states: a reset state and an evaluation state. A clock signal CLK and the inverted clock signal CLK' determine which of the two states the TLE 10 is. The clock signal CLK and the inverted clock signal CLK' may also be referred to as clock signals for the TLE 10. In order to enter the reset state, the clock signal CLK is set to a voltage level corresponding to a logic "0," and therefore the clock signal CLK' is a logic "1." As a result, the transistor M9 and the transistor M10 are both activated and allow for the isolated control node 22 and the isolated control node 24 to be discharged. Accordingly, the first input gate network 12 and the second input gate network 14 are deactivated such that the outputs of the first input gate network 12 and the second input gate network 14, and thus the isolated control node 22 and the isolated control node 24 of the first amplifier branch 16 and the second amplifier branch 18, are discharged or pulled to a voltage level corresponding to a logic "0." When the isolated control node 22 and the isolated control node 24 of the first amplifier branch 16 and the second amplifier branch 18 are pulled to logic "0," the transistors M7 and M8 are activated, and the transistors M1 and M4 are deactivated. As a result, the output nodes 26 and 28 of the first amplifier branch 16 and the second amplifier branch 18, respectively, are pulled to a voltage level corresponding to a logic value "1" via the transistors M1 and M4. Once reset is complete, the transistors M1, M4, M5, and M6 are actived, and the remaining transistors M2, M3, M7, and M8 are deactivated. At this point, the TLE 10 is primed for evaluation.

On the rising edge of the clock signal CLK and falling edge of the inverted clock signal CLK', the TLE 10 transitions to the evaluation state. In the evaluation state, either the output node 26 of the first amplifier branch 16 or the output node 28 of the second amplifier branch 18 is pulled to a logic "0," which results in the differential logical output DLO being provided with either a differential logical state of "0/1" or a differential logical state of "1/0" to the sequential state element 20. More specifically, as the clock signal CLK rises and the inverted clock signal CLK' falls, a current race begins between the first amplifier branch 16 and the second amplifier branch 18. The transistor M9 and the transistor M10 are both deactivated and prevent the isolated control node 22 and the isolated control node 24 from being discharged through the transistor M9 and the transistor M10, respectively.

The first amplifier branch 16 wins the current race if the first input gate network 12 charges the output node 26 of the first input gate network 12 to a voltage level sufficient to activate the transistor M7 and deactivate the transistor M1 before the second input gate network 14 charges the output node 28 to a voltage level sufficient to activate the transistor M8 and deactivate the transistor M4. In one embodiment, the first input gate network 12 wins the current race if the number of transmission gates in the first input gate network 12 activated by the first set of logical inputs is larger than the number of gates in the second input gate network 14 activated by the second set of inputs. Likewise, the second amplifier branch 18 wins the current race if the second input gate network 14 charges the output node 28 of the second input gate network 14 to a voltage level sufficient to activate the transistor M8 and deactivate the transistor M4 before the first input gate network 12 charges the output node 26 to a voltage level sufficient to activate the transistor M7 and deactivate the transistor M1. In one embodiment, the second amplifier branch 18 wins the current race if the number of transmission gates in the second input gate network 14 activated by the second set of logical inputs is larger than the number of gates in the first input gate network 12 activated by the first set of logical inputs.

If the first amplifier branch 16 wins the current race, the isolated control node 22 of the first amplifier branch 16, reaches a logic "1" before the isolated control node 24 of the second amplifier branch 18 reaches a logic "1." As the isolated control node 22 of the first amplifier branch 16 reaches a logic "1," the transistor M1, which is a p-type Metal-Oxide-Semiconductor (PMOS) device, becomes inactive, thereby cutting off the path from the output node 26 of the first amplifier branch 16 to the supply voltage VD. In addition, the transistor M7, which is an n-type Metal-Oxide-Semiconductor (NMOS) device, becomes active, thereby pulling the output node 26 of the first amplifier branch 16 towards ground through the transistor M5. As the output node 26 of the first amplifier branch 16 discharges, the transistor M3 of the second amplifier branch 18, which is a PMOS device, becomes active, and the transistor M6 of the second amplifier branch 18, which is an NMOS device, becomes inactive. Thus, the output node 28 of the second amplifier branch 18 does not discharge. At the end of the evaluation, the first logical output N1 provided from the output node 26 of the first amplifier branch 16 is at a logic "0," and the second logical output N2 provided at the output node 28 of the second amplifier branch 18 is at a logic "1." The differential logical output DLO is provided with the differential logical state of "0/1" to the sequential state element 20. In this case, the sequential state element 20 generates a logical output Q at a logic "1" and an inverted logical output Q' at a logic "0."

Similarly, if the second amplifier branch 18 wins the current race, the isolated control node 24 of the second amplifier branch 18, reaches a logic "1" before the isolated control node 22 of the first amplifier branch 16 reaches a logic "1." As the isolated control node 24 of the second amplifier branch 18 reaches a logic "1," the transistor M4, which is a PMOS device, becomes inactive, thereby cutting off the path from the output node 28 of the second amplifier branch 18 to the supply voltage VD. In addition, the transistor M8, which is an NMOS device, becomes active, thereby pulling the output node 28 of the second amplifier branch 18 towards ground through the transistor M6. As the output node 28 of the second amplifier branch 18 discharges, the transistor M2 of the first amplifier branch 16, which is a PMOS device, becomes active, and the transistor M5 of the first amplifier branch 16, which is an NMOS device, becomes inactive. Thus, the output node 26 of the first amplifier branch 16 does not discharge. At the end of the evaluation, the first logical output N1 provided from the output node 26 of the first amplifier branch 16 is at a logic "1," and the second logical output N2 provided at the output node 28 of the second amplifier branch 18 is at a logic "0." The differential logical output DLO is provided with the differential logical state of "1/0" to the sequential state element 20. In this case, the sequential state element 20 generates the logical output Q at a logic "0" and an inverted logical output Q' at a logic "1."

The logical outputs Q and Q' of the sequential state element 20 are adjusted accordingly by the sequential state element 20. The differential logical output DLO includes the first logical output N1 that is received by the input terminal S of the sequential state element 20. In this embodiment, the sequential state element 20 is an SR latch. The input terminal S is the set terminal of the sequential state element 20 and the first logical signal N1 is received at the input terminal S. The differential logical output DLO includes the second logical output N2 that is received by the input terminal R of the sequential state element 20. The input terminal N2 is the reset terminal of the sequential state element 20 and the second logical output N2 is received at the input terminal R. In this case, the differential logical output DLO is provided as a differential voltage and the first logical output N1 and the second logical output N2 are each provided as output voltages.

Note that after evaluation is completed, all nodes in the TLE 10 have a closed path to either the supply voltage VD or ground. Because of this, the output nodes 26, 28 are latched, and no change in the active number of transmission gates in either of the first input gate network 12 and the second input gate network 14 will have any effect on the logical states stored at the output nodes 26, 28 until the beginning of the next evaluation.

Further, note that whether the first input gate network 12 or the second input gate network 14 wins the current race may depend on the number of active transmission gates, as discussed above. However, transistor size or gate widths for the gates forming the first input gate network 12 and the second input gate network 14 may vary in order to allow weighting of the first set of inputs and the second set of inputs. Thus, in this case, the current race may depend on the number of active transmission gates and the sizes or widths of those active gates. Also note that weighting may be performed by allocation of one or more gates per input or, in other words, by providing a single input to multiple gates. Alternatively, each of the transmission gates in the first input gate network 12 and the second input gate network 14 may be the same. More than one of the first set of logical inputs and/or the second set of logical inputs may represent the same Boolean variable so that the Boolean variable is given a weight greater than one.

Referring again to FIG. 1, FIG. 1 illustrates first embodiments of the first input gate network 12 and the second input gate network 14. In this embodiment, the first input gate network 12 and the second input gate network 14 are implemented as transmission gate networks. In the illustrated embodiment, the first input gate network 12 is formed by a number of transmission gates 30-1 through 30-$n$ (referred to generically as elements "30") connected in parallel branches as shown. In this embodiment, each of the transmission gates 30 is a PFET (such as a PMOS) and has a drain coupled to receive the clock signal CLK. The clock signal CLK thus deactivates the transmission gates 30-1 through 30-$n$ when at a low voltage level (i.e., at a logic "0") and allows for the transmission gates 30-1 through 30-$n$ to be activated when at a high voltage level (i.e., at a logic "1"). Likewise, as illustrated in FIG. 1, the second input gate network 14 is formed by a number of transmission gates 32-1 through 32-$m$ (referred to generically as elements 32) connected in parallel branches as shown. The clock signal CLK deactivates the transmission gates 32-1 through 32-$m$ when at a low voltage level (i.e., at a logic "0") and activates the transmission gates 32-1 through 32-$m$ when at a high voltage level (i.e., at a logic "1"). In this embodiment, each of the transmission gates 32 is a PFET (such as a PMOS) and has a drain coupled to receive the clock signal CLK. Note that the number of gates (n) in the first input gate network 12 and the number of gates (m) in the second input gate network 14 may or may not be equal depending on the particular implementation. Each of the transmission gates 30 of the first input gate network 12 has a gate that is configured to receive a different corresponding one of a first set of logical inputs x1-$xn$ (referred to generically as element x). Each of the transmission gates 32 also has a gate that is configured to receive a different corresponding one of a second set of logical inputs y1-$ym$ (referred to generically as element y).

There are various signal assignment techniques that may be used to implement a threshold logic function with the TLE 10 shown in FIG. 1. Threshold logic functions are a proper subset of unate functions. Without loss of generality, it can be assumed that they are also positive, i.e., all the weights are positive integers. The TLE 10 can be configured to realize a given positive threshold function f (z1, z2, . . . , zt), where z1-$zt$ (referred to generically as elements z) are each a Boolean input. Signal assignment techniques are techniques for providing the Boolean inputs z and complements (referred to specifically as elements z1'-$zt$' or generically as elements z') of the Boolean inputs z to the appropriate transmission gates 30, 32 in the first input gate network 12 and the second input gate network 14. There are many possible ways to do this assignment, and the implementation of the TLE 10 is not restricted to any particular one. However, the specific signal assignment technique described herein is viewed as having n number of bit inputs. In this example, the number m is also considered to be equal to n so that the number of transmission gates in the first input gate network 12 and the number of transmission gates in the second input gate network 14 are equal. The second set of logical inputs y of the transmission gates 32 in the second input gate network 14 will be driven by bit inputs (which include the Boolean inputs z), while the first set of logical inputs x of the transmission gates 30 of the first input gate network 12 will be driven by complements of the bit inputs (which include the complement Boolean inputs z'). This signal assignment is referred to as complementary signal assignment (CSA).

To ensure that the number of transmission gates 30, 32 in the first input gate network 12 and the second input gate network 14 are never equal, n is odd. This is because if n number were even, and if r number were active in the first input gate network 12, then n−r would be active in the second input gate network 14. Hence if r=n=2, an equal number of transistors would be active in the first input gate network 12 and second input gate network 14. However, an unequal number of the transmission gates need to be activated in order for the differential sense amplifier DSA shown in FIG. 1 to implement the threshold logic function. Thus, the number of transmission gates in the first input gate network 12 and the number of transmission gates in the second input gate network 14 are each odd and greater than 1. Since the first input gate network 12 and second input gate network 14 are complementary, for the logical outputs N1, N2 to be 0, just over ½ (or more) of the transmission gates 30 in the first input gate network 12 must be active. Hence with the number of transmission gates in the first input gate network 12 and the number of transmission gates in the second input gate network 14 each being odd being odd, the TLE 10 with this signal assignment (all transmission gates 30 driven by a distinct and corresponding one of the logical inputs x), implements the threshold function defined by:

Equation 1:

$$x1+x2+\ldots+xn >= (n+1)/2 \quad (1)$$

Consider the generic threshold function f (z1, z2, . . . , zt) defined by w1*z1+w2*z2+ . . . +wt*zt>=T, that is to be realized by the TLE 10. Clearly if T>(n+1)/2, then the function f cannot be implemented by TLE 10, given the above mentioned assumptions. Hence T>(n+1)/2. Let D=(n+1)/2−T and W=the summation of the weights w1 through wt. This demonstrates that bit signals can be mapped to the logical inputs x, y of the TLE 10 to realize f (z1, z2, . . . , zt), replicate z, w times for 1<=i<=m in the definition of f.

Equation 2:

$$x1 \ldots +xj+xd \ldots +xk \ldots +xq \ldots +xl >= T \quad (2)$$

In equation 2, each of the logical inputs x1 through xj is assigned the same Boolean input z1 so as to equal w1*z1, each of the logical inputs xd to xk is assigned the Boolean input z2 to equal w2*z2, . . . , and each of the logical inputs xq to xl is assigned to the logical value zt to equal wt*zt.

Given equations 1 and 2, the second condition on the TLE 10 to be able to realize f (z1; z2; . . . ; zt) is W+D>=n, or W−T<=(n−1)=2, given a TLE 10 with n number of transmission gates 30, 32. As such, equation 2 can be represented as:

Equation 3:

$$x1 \ldots +xj+xd \ldots +xk \ldots +xq \ldots +xl+D >= (n+1)/2 \quad (3)$$

Since the first set of logical inputs x are set to complements, the first set and the second set of the logical inputs x, y are assigned as follows: (1) D number of the logical inputs y are assigned a logical "1," for each of the Boolean inputs z, (2) w number of the logical inputs y are assigned to represent the same Boolean input z, (3) any remaining logical inputs y are assigned to a logical "0", and (4) each of the logical inputs x is assigned to be a CSA of one of the logical inputs y. Thus, the first set of logical inputs x is thus provided to the first input gate network 12 as the complement of the second set of logical inputs y to the second input gate network 14.

As shown in FIG. 1, a resistive element network 34 includes a plurality of resistive elements (referred to generically as elements R and specifically as elements RX1-RXn and elements RY1-RYm). Each of the resistive elements R is coupled in series in one of the parallel branches with a corresponding one of the transmission gates 30, 32 of one of the first and second input gate networks 12, 14. The resistive element network 34 shown in FIG. 1 is provided so as to present a resistance to each of the transmission gates 30 in the first input gate network 12 such that each of the transmission gates 30 operate in a linear region during the evaluation state. Likewise, the resistive element network 34 shown in FIG. 1 is provided so as to present a resistance to each of the transmission gates 32 in the second input gate network 14 such that each of the transmission gates 32 operate in a linear region during the evaluation state.

More specifically, the resistive element RX1 is coupled in series with the transmission gate 30-1 that receives the logical input x1. The resistive element RX1 is configured to present a resistance to the transmission gate 30-1 such that the transmission gate 30-1 operates in a linear region during the evaluation state of the TLE 10. The resistive element RX2 is coupled in series with the transmission gate 30-2 that receives the logical input x2. The resistive element RX2 is configured to present a resistance to the transmission gate 30-2 such that the transmission gate 30-2 operates in a linear region during the evaluation state of the TLE 10. The resistive element RXn is coupled in series with the transmission gate 30-n that receives the logical input xn. The resistive element RXn is configured to present a resistance to the transmission gate 30-n such that the transmission gate 30-n operates in a linear region during the evaluation state of the TLE 10. The resistive element RY1 is coupled in series with the transmission gate 32-1 that receives the logical input y1. The resistive element RY1 is configured to present a resistance to the transmission gate 32-1 such that the transmission gate 32-1 operates in a linear region during the evaluation state of the TLE 10. The resistive element RY2 is coupled in series with the transmission gate 32-2 that receives the logical input y2. The resistive element RY2 is configured to present a resistance to the transmission gate 32-2 such that the transmission gate 32-2 operates in a linear region during the evaluation state of the TLE 10. Finally, the resistive element RXm is coupled in series with the transmission gate 32-m that receives the logical input ym. The resistive element RYm is configured to present a resistance to the transmission gate 32-m such that the transmission gate 32-m operates in a linear region during the evaluation state of the TLE 10.

The resistive element network 34 thereby makes the TLE 10 more robust at lower voltages (i.e., the supply voltage VD has a low DC voltage magnitude). In essence, the resistive element network 34 decreases a minimum allowable time difference required in order for the first amplifier branch 16 and the second amplifier branch 18 to correctly determine the differential logical output DLO during the evaluation phase. By increasing the resistance at the isolated control node 22 and the isolated control node 24, a voltage drop across the parallel branches will mostly occur through the resistive elements R thereby allowing the transmission gates 30, 32 to operate mostly as linear resistors during the evaluation state of the TLE 10. If the resistance presented by the resistance elements R of the resistive element network 34 is large enough, the resistance of the transmission gates 30, 32 is negligible during the evaluation state. As a result, discharge currents through the differential sense amplifier DSA are increased during the evaluation state, thereby allowing the differential sense amplifier DSA to operate faster with the given supply voltage VD while still providing the differential logical output DLO in the appropriate differential logic state.

Each of the resistive elements R may be provided using any type of suitable resistance element capable of provided desired resistance values. For example, each of the resistive elements R may be provided as a passive resistor having the resistance required for the above recited operation. However, significant improvements in robustness often require large resistances and thus would require large passive resistors and thus may not be practical for a given IC environment. Accordingly, each of the resistive elements R may be provided as a programmable resistive element. For instance, each of the resistive elements R may be provided as a resistive read only memory (RRAM) device, as explained in further detail below. The RRAM devices can generally provide a greater amount of resistance while providing good spatial efficiency.

Figure 2:
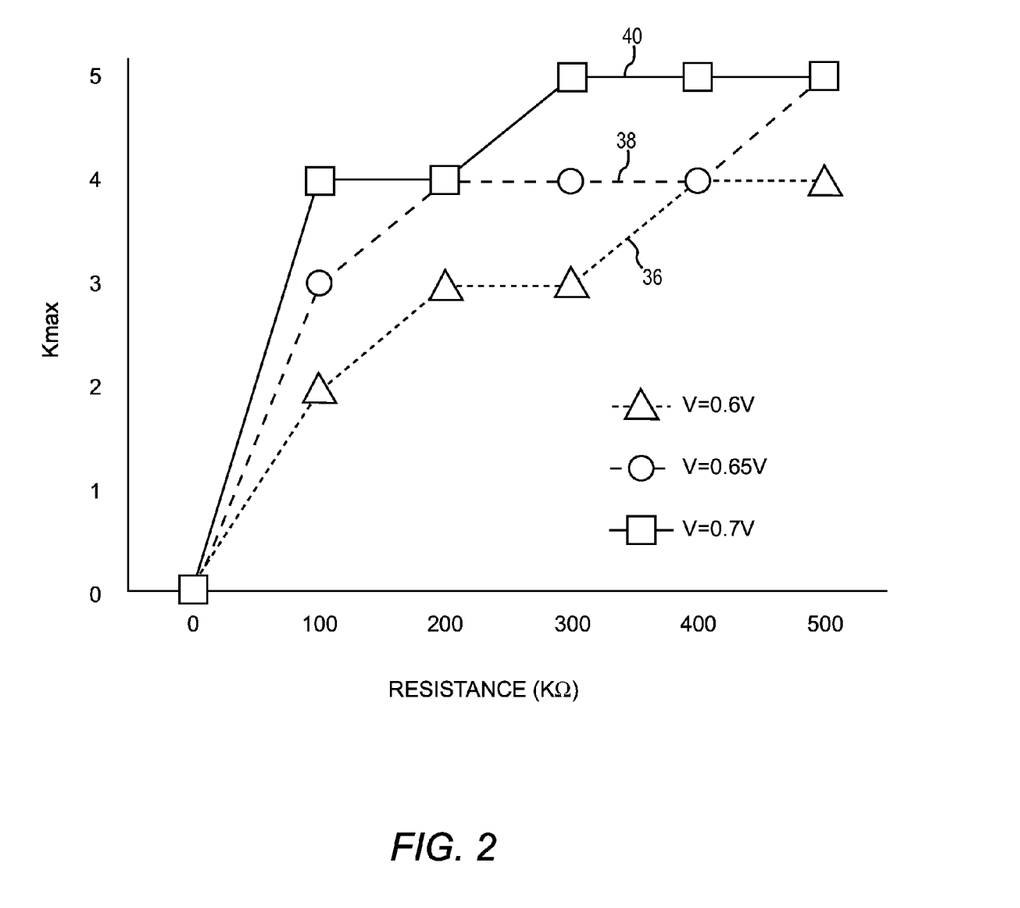
FIG. 2 illustrates embodiments of curves relating a maximum number of transmission gates switched on for a threshold logic function performed by the threshold logic element shown in FIG. 1 and a resistance of each of the resistive elements, wherein the curves were obtained through Monte Carlo simulations.

FIG. 2 illustrates embodiments of curves 36, 38, 40 relating a number Kmax versus the resistance of each of the resistive elements R (shown in FIG. 1 and assuming each of the resistive elements R are provided to be the same). The number Kmax describes a maximum number of the transmission gates 30, 32 in each of the first and second input gate networks 12, 14 that can be activated to implement a particular threshold function. The curves 36, 38, 40 were obtained through Monte Carlo simulations. The curve 36 is provided when the supply voltage VD (shown in FIG. 1) is provided to have a DC voltage magnitude of 0.6V. The curve 38 is provided when the supply voltage VD (shown in FIG. 1) is provided to have a DC voltage magnitude of 0.65V. The curve 40 is provided when the supply voltage VD (shown in FIG. 1) is provided to have a DC voltage magnitude of 0.7V. Also, the curves 36, 38, 40 considered global variations and local mismatches when implementing CMOS technology. For each resistive value of the resistance of the resistive elements R, the number Kmax that satisfied the robustness criterion of 99.99% successes was computed. Thus, the curves 36, 38, 40 of FIG. 2 show that the TLE 10 shown in FIG. 1 can be very robust.

Figure 3:
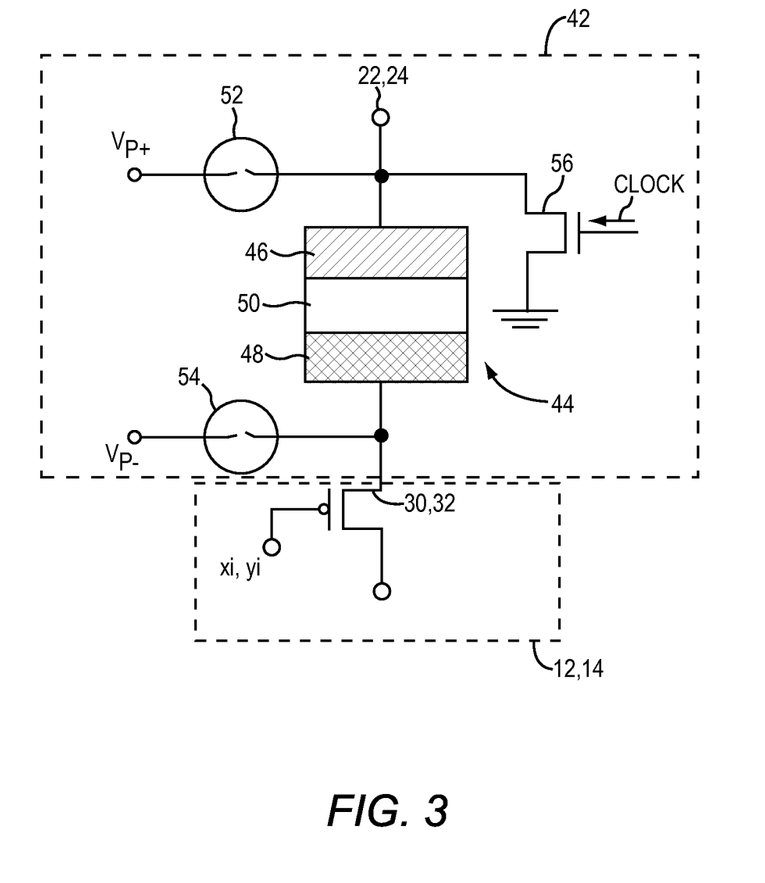
FIG. 3 illustrates an embodiment of an RROM device, which may be utilized to provide the resistive elements shown in FIG. 1.

FIG. 3 illustrates an embodiment of an RROM device 42, which may be utilized to provide the resistive elements R shown in FIG. 1. Each of the resistive elements R shown in FIG. 1 in the resistive element network 34 may be provided as the RROM device 42 shown in FIG. 3; one of the resistive elements R shown in FIG. 1 in the resistive element network 34 may be provided as the RROM device 42 shown in FIG. 3; or only some of the resistive elements R shown in FIG. 1 in the resistive element network 34 may each be provided as the RROM device 42 shown in FIG. 3. With respect to FIG. 1, preferably all of the resistive elements R shown in FIG. 1 in the resistive element network 34 may each be provided as the RROM device 42 shown in FIG. 3.

Referring again to FIG. 3, the RROM device 42 includes an RROM cell 44 having a first electrode 46, a second electrode 48, and an insulating layer 50 provided between the first electrode 46 and the second electrode 48. The first electrode 46 and the second electrode 48 may be provided from any material suitable to resistive random access memory (RRAM) devices. In other words, the RROM device 42 is being provided by technology typically utilized to build an RRAM device. The insulating layer 50 may be formed from dielectric(s) or any other type of suitable material. The RROM cell 44 is switchable to and from a high resistance state (HRS) to a low resistance state (LRS). Preferably, the HRS of the RROM cell 44 is at least 100 kiloohms and as explained in further detail below more optimal results are obtain when the HRS is 500 kiloohms. The RROM device 42 is configured to switch a resistance presented between the isolated control node 22 and the transmission gate 30 (in the case of the first input gate network 12) or a resistance presented between the isolated control node 24 and the transmission gate 32 (in the case of the second input gate network 14) from the LRS to the HRS and from the HRS to the LRS. As such, the RROM cell 44 is coupled between the isolated control node 22 and the transmission gate 30 (in the case of the first input gate network 12) or the isolated control node 24 and the transmission gate 32 (in the case of the second input gate network 14). More specifically, the first electrode 46 is connected to the isolated control node 22 (in the case of the first input gate network 12) or the isolated control node 24 (in the case of the second input gate network 14). The second electrode 48 is connected to the transmission gate 30 (in the case of the first input gate network 12) or the transmission gate 32 (in the case of the second input gate network 14).

A first selector 52 is also coupled to the first electrode 46 while a second selector 54 is connected to the second electrode 48. The first selector 52 and the second selector 54 are part of the programming circuitry used to set the resistance of the RROM device 42 and more specifically the RROM cell 44. A transistor 56 is provided, which is an NFET. The transistor 56 has a gate configured to receive a clock signal CLOCK, a drain coupled to the first selector 52 and the first electrode 46, and a source coupled to ground. The first selector 52 and the second selector 54 are configured to provide the RROM cell 44 in the HRS or the LRS. To do this, the clock signal CLOCK is provided to the gate of the transistor 56. To set the RROM cell 44 to the LRS, a large positive forming voltage pulse is applied to the first selector 52 which sets the RROM cell 44 to the LRS while the clock signal CLOCK is low. Following this, the clock signal CLOCK is high, and a large negative reset pulse is applied to the second selector 54 which resets the RROM cell 44 to the HRS. Thus, inputting the positive or negative pulses, the RROM device can be switched to and from the HRS and the LRS. The resistance of the RROM device 42 only needs to be initially programmed once after fabrication.

Figure 4:
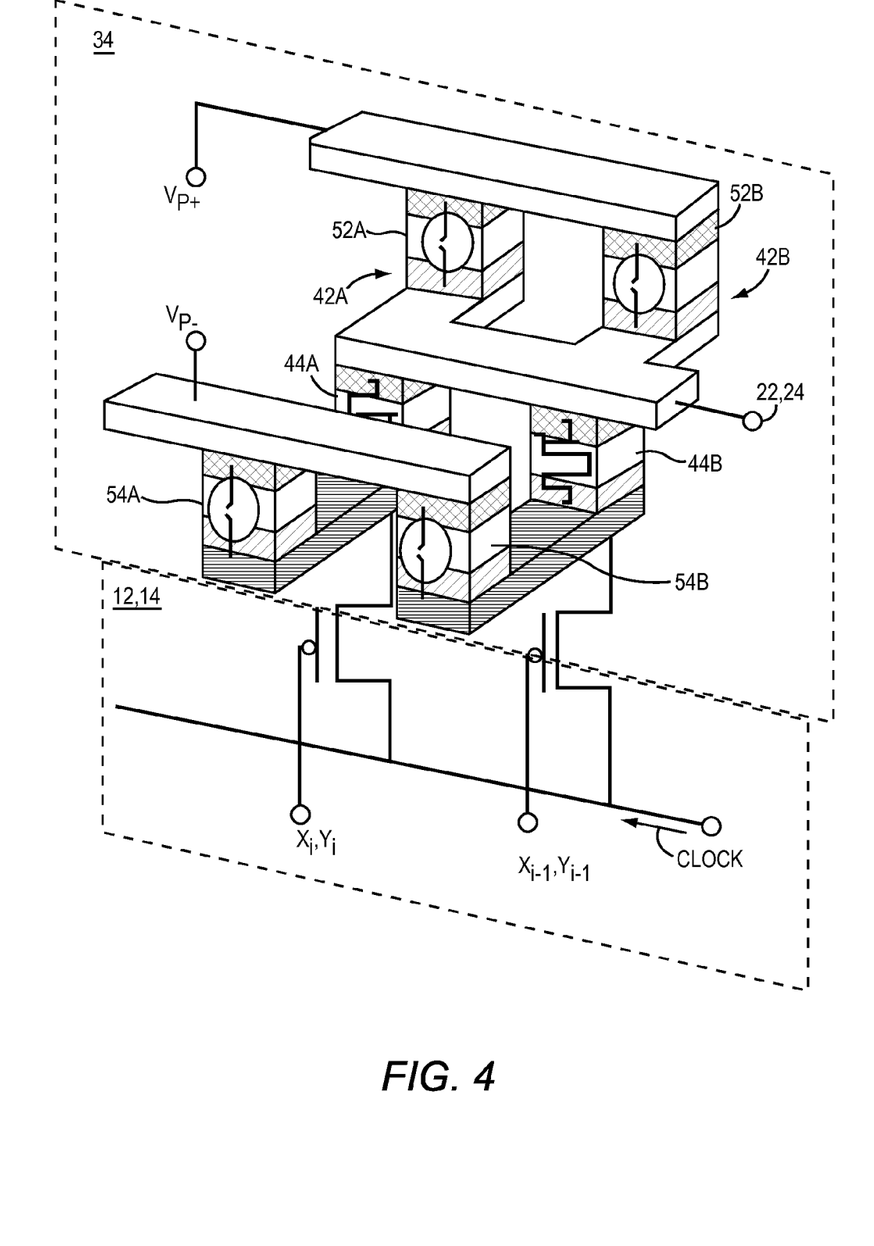
FIG. 4 illustrates one embodiment of a three dimensional arrangement of RROM devices.

FIG. 4 illustrates one embodiment of a portion of the resistive element network 34 having embodiments of a pair of resistive elements R from FIG. 1. More specifically, FIG. 4 is a 3-D arrangement having an RROM device 42A and an RROM device 42B each of which is the same as the RROM device 42 shown in FIG. 3. The RROM device 42A is formed from 3 pillars, one of which is a first selector 52A, like the first selector 52 shown in FIG. 3, an RROM cell 44A, like the RROM cell 44 shown in FIG. 3, and a second selector 54A, like the second selector 54 shown in FIG. 3. Note that traces are formed to connect the RROM cell 44A, the first selector 52A, and the second selector 54A to the isolated control node 22 (in the case of the first input gate network 12) or the isolated control node 24 (in the case of the second input gate network 14), and to the transmission gate 30 (in the case of the first input gate network 12) or the transmission gate 32 (in the case of the second input gate network 14). Likewise, the RROM device 42B is formed from 3 pillars, one of which is a first selector 52B, like the first selector 52 shown in FIG. 3, an RROM cell 44B, like the RROM cell 44 shown in FIG. 3, and a second selector 54B, like the second selector 54 shown in FIG. 3. Note that traces are formed to connect the RROM cell 44B, the first selector 52B, and the second selector 54B to the isolated control node 22 (in the case of the first input gate network 12) or the isolated control node 24 (in the case of the second input gate network 14), and to the transmission gate 30 (in the case of the first input gate network 12) or the transmission gate 32 (in the case of the second input gate network 14). Note that RROM devices 42A, 42B can be provided in a top metal layer of an IC and do not contribute to the semiconductor area.

Figure 5:
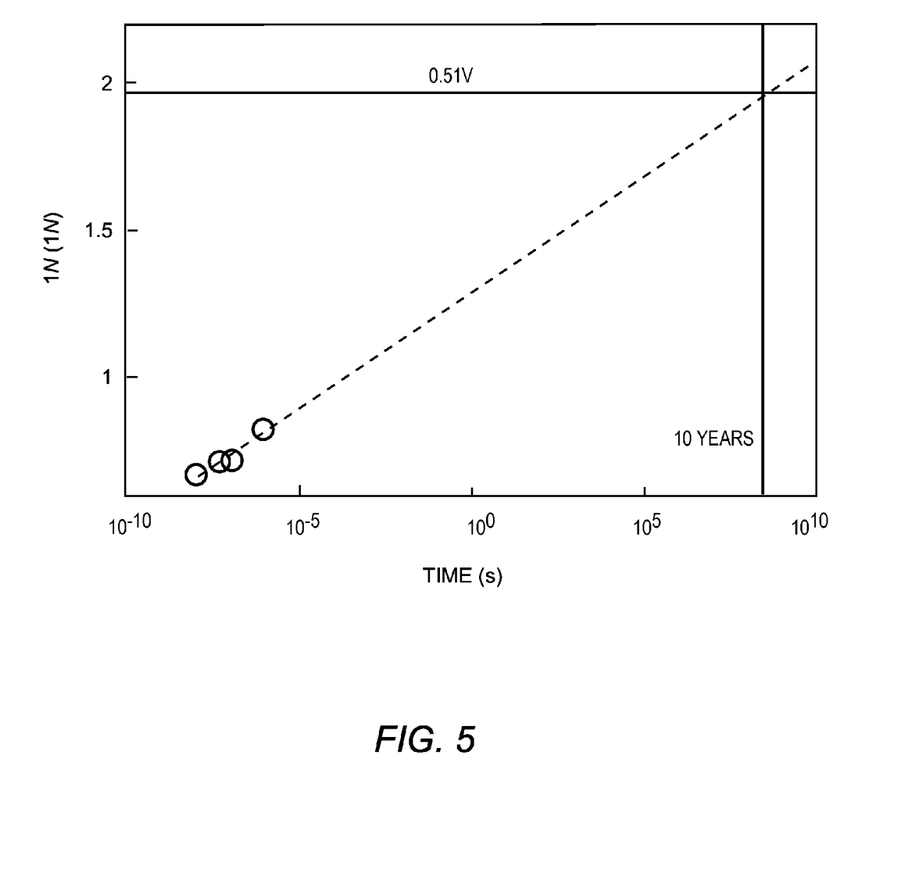
FIG. 5 is a graph illustrating a lifetime vs voltage stress graph for the RROM device shown in FIG. 3.

FIG. 5 is a graph illustrating the RROM device 44 lifetime vs voltage stress graph. There is a well-known exponential voltage-time relationship in the switching dynamics of RROM, i.e., the switching time exponentially depends on the applied voltage. To ensure a lifetime of at least 10 years at low voltage stress, an RROM compact device model is used to study the dynamics of the resistance drift. Extrapolating from experimental data using a 1 E model, FIG. 5 illustrates that the RROM device 42 shown in FIG. 3 is under continuous voltage stress for 10 years. The voltage drop across RROM device 42 shown in FIG. 3 within the TLE 10 shown in FIG. 1 is much less than 0.51 V, ensuring a significantly longer lifetime.

Figure 6:
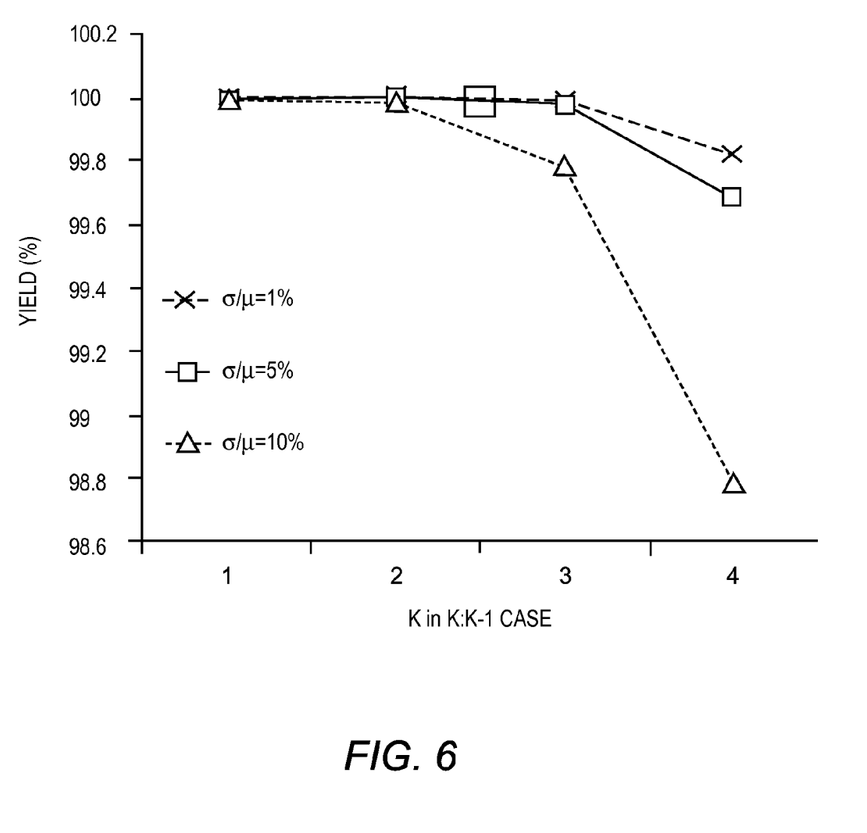
FIG. 6 shows the yield calculations of the threshold logic element shown in FIG. 1 using the RROM device shown in FIG. 3 for each of the resistive elements and in the presence of process variations.

FIG. 6 shows the yield calculations of the TLE 10 shown in FIG. 1 using the RROM device 42 shown in FIG. 3 as each of the resistive elements R shown in FIG. 1 in the presence of process variations. The yield calculation is based on 100,000 Monte Carlo simulations, which includes variations in both transistors and the RROMs. The mean resistance of each of the RROM devices is 500 kΩ, and the simulations were carried out with standard deviation/means equal to 1%, 5% and 10%. The simulations indicate high circuit yields with the number of transmission gates equal to 4, and the required deviation/mean should be no more than 5%.

Those skilled in the art will recognize improvements and modifications to the preferred embodiments of the present disclosure. All such improvements and modifications are considered within the scope of the concepts disclosed herein and the claims that follow.

What is claimed is:

1. A threshold logic element comprising:
    a first input gate network configured to receive a first set of logical signals;
    a second input gate network configured to receive a second set of logical signals;
    a differential sense amplifier operably associated with the first input gate network and the second input gate network such that the differential sense amplifier is configured to generate a differential output in accordance with a threshold logic function; and
    a resistive network coupled between the differential sense amplifier and the first input gate network and between the differential sense amplifier and the second input gate network.

2. The threshold logic element of claim 1 wherein the resistive network comprises a resistive element.

3. The threshold logic element of claim 2 wherein the resistive element comprises a resistive read only memory (RROM) device.

4. The threshold logic element of claim 2 wherein the first input gate network comprises a transmission gate configured to receive a first one of the first set of logical inputs and wherein the transmission gate is coupled in series with the resistive element.

5. The threshold logic element of claim 4 wherein the resistive element has a resistance such that the transmission gate operates in a linear region during an evaluation state of the threshold logic element.

6. The threshold logic element of claim 5 wherein the transmission gate is a field effect transistor.

7. The threshold logic element of claim 6 wherein the resistive element comprises a resistive read only memory (RROM) device.

8. The threshold logic element of claim 7 wherein the RROM device comprises an RROM cell having a first electrode coupled to the differential sense amplifier, a second electrode coupled to the transmission gate, and an insulator layer between the first electrode and the second electrode.

9. The threshold logic element of claim 8 wherein the RROM device further comprises:
   a first selector coupled to the first electrode and configured such that transmitting a positive pulse into the first selector provides the RROM cell in a low resistance state; and
   a second selector coupled to the second electrode and configured such that transmitting a negative pulse into the second selector provides the RROM cell in a high resistance state.

10. The threshold logic element of claim 9 wherein the high resistance state is at least 100 kiloohms.

11. The threshold logic element of claim 2 wherein the second input gate network comprises a transmission gate configured to receive a first one of the second set of logical inputs and wherein the transmission gate is coupled in series with the resistive element.

12. The threshold logic element of claim 11 wherein the resistive element has a resistance such that the transmission gate operates in a linear region during an evaluation state of the threshold logic element.

13. The threshold logic element of claim 12 wherein the transmission gate is a field effect transistor.

14. The threshold logic element of claim 13 wherein the resistive element comprises a resistive read only memory (RROM) device.

15. The threshold logic element of claim 13 wherein the RROM device comprises an RROM cell having a first electrode coupled to the differential sense amplifier, a second electrode coupled to the transmission gate, and an insulator layer between the first electrode and the second electrode.

16. The threshold logic element of claim 15 wherein the RROM device further comprises:
   a first selector coupled to the first electrode and configured such that transmitting a positive pulse into the first selector provides the RROM cell in a low resistance state; and
   a second selector coupled to the second electrode and configured such that transmitting a negative pulse into the second selector provides the RROM cell in a high resistance state.

17. The threshold logic element of claim 16 wherein the high resistance state is at least 100 kiloohms.

18. The threshold logic element of claim 1 wherein the differential sense amplifier comprises
   a first amplifier branch operably associated with the first input gate network; and
   a second amplifier branch operably associated with the second input gate network.

19. The threshold logic element of claim 18 wherein the differential sense amplifier is configured to generate the differential output based on a current race between the first amplifier branch and the second amplifier branch during an evaluation state.

20. The threshold logic element of claim 19 wherein the differential sense amplifier presets an output of the first amplifier branch to a first logic state and presets an output of the second amplifier branch to a second logic state during a reset state.

* * * * *